(12) United States Patent
Malone et al.

(10) Patent No.: US 12,126,457 B2
(45) Date of Patent: Oct. 22, 2024

(54) ACTIVE POWER EDGE DEVICE AND ELEMENT MANAGER

(71) Applicant: Hughes Network Systems, LLC, Germantown, MD (US)

(72) Inventors: Carl Malone, South Jordan, UT (US); Ronald Paul Alder, Orem, UT (US); Quinn Jensen, Germantown, MD (US); T. Kelly Bradford, St. George, UT (US); Mike Balzotti, Saratoga Springs, UT (US); Rahul Rode, Ashburn, VA (US); Ben Dorton, Provo, UT (US); Kim Clark, Mona, UT (US); John Hundley, Lehi, UT (US)

(73) Assignee: Hughes Network Systems, LLC, Germantown, MD (US)

( * ) Notice: Subject to any disclaimer, the term of this patent is extended or adjusted under 35 U.S.C. 154(b) by 65 days.

(21) Appl. No.: 18/152,581

(22) Filed: Jan. 10, 2023

(65) Prior Publication Data
US 2024/0235864 A1   Jul. 11, 2024

(51) Int. Cl.
*H04L 12/10*  (2006.01)
*H04L 67/141* (2022.01)
*H04L 67/562* (2022.01)

(52) U.S. Cl.
CPC ........... *H04L 12/10* (2013.01); *H04L 67/141* (2013.01); *H04L 67/562* (2022.05)

(58) Field of Classification Search
CPC ...... H04L 12/10; H04L 67/141; H04L 67/562
See application file for complete search history.

(56) References Cited

U.S. PATENT DOCUMENTS

| | | | |
|---|---|---|---|
| 11,089,114 B1* | 8/2021 | Saalfeld | H04L 43/103 |
| 2009/0215319 A1* | 8/2009 | Gandhi | H01R 13/7038 |
| | | | 439/654 |
| 2010/0038218 A1* | 2/2010 | Fisher | H01R 13/70 |
| | | | 200/550 |
| 2012/0119577 A1* | 5/2012 | Clarke | H02J 13/00009 |
| | | | 307/40 |
| 2017/0269663 A1* | 9/2017 | Nicholson | H04L 12/10 |
| 2018/0090989 A1* | 3/2018 | Subbloie | H02J 13/00024 |
| 2018/0159752 A1* | 6/2018 | Fratini | H04L 43/0811 |
| 2021/0200533 A1* | 7/2021 | Gage | G06F 8/71 |
| 2022/0159769 A1* | 5/2022 | Zhang | H04L 43/16 |

(Continued)

OTHER PUBLICATIONS

International Search Report for PCT Application No. PCT/US2023/082231.

(Continued)

*Primary Examiner* — Faisal M Zaman
(74) *Attorney, Agent, or Firm* — Capitol City TechLaw; Jasbir Singh

(57) ABSTRACT

An Active Power Edge device may include a power strip comprising electrical outlets; a MQ Telemetry Transport (MQTT) client to communicate with a broker and to receive a configuration from the broker; and a monitor to enable the electrical outlets per the configuration, to perform status checks and to report a result of the status checks to the broker via the MQTT client, wherein the configuration includes an outlet device and a status check definition, and the status checks are performed per the status check definition.

20 Claims, 3 Drawing Sheets

(56) References Cited

U.S. PATENT DOCUMENTS

2023/0385399 A1* 11/2023 Lin .................. G06F 21/81
2024/0160521 A1* 5/2024 Angelsmark ....... G06F 11/3006

OTHER PUBLICATIONS

Rehak Jan: "PowerCable xxx 101x Manual", Apr. 29, 2020 (Apr. 29, 2020), pp. 1-79, XP093136920, Retrieved from the Internet: URL:https://www.netio-products.com/files/download/sw/version/PowerCable-xxx-MANUAL-en_1-2-0.pdf [retrieved on Mar. 1, 2024] p. 4-p. 8, p. 29, p. 43, p. 69 - p. 74.
Unknown: "NETIO PowerPDU 4PS", May 19, 2021 (May 19, 2021), pp. 1-2, XP093136999, Retrieved from the Internet: URL:https://www.netio-products.com/files/download/sw/version/PowerPDU-4PS-FLYER-en_1-0-2.pdf [retrieved on Mar. 1, 2024], p. 1-p. 2.
Valerie Lampkin Weng Tat Leong Leonardo Olivera Sweta Rawat Nagesh Subrahmanyam Rong Xiang Ed—Valerie Lampkin Weng Tat Leong Le: "Building Smarter Planet Solutions with MQTT and IBM WebSphere MQ Telemetry", IBM Redbooks, IBM, pp. 1-250, Sep. 30, 2012 (Sep. 30, 2012), XP009536306, ISBN: 978-0-7384-3708-8 Retrieved from the Internet: URL:https://www.redbooks.ibm.com/redbooks/pdfs/sg248054. pdf, [retrieved on Mar. 1, 2024], the whole document.

* cited by examiner

ACTIVE POWER EDGE DEVICE AND ELEMENT MANAGER

FIELD

A smart, Internet Protocol (IP) enabled multiple outlet power-supply device and method is disclosed. The device is installed at a remote site and boosts site reliability and reduces helpdesk costs by autonomously responding to local site network outages as well as providing ability to remotely power-cycle devices connected to specific outlets. The device pings devices on the network, detects if a section of the network is not reachable, determines the outlet associated with unreachable network section and recycles the power to the remote device associated with the outlet. This recycling may be used in situations where a remote device is in a stuck state and a simple reboot of the device may fix the connectivity issue.

BACKGROUND

The present disclosure allows for power management of a vast network end nodes. It also reduces the need for sending a technician to a network site. The present teachings reduce site downtime, prevent support calls from the remote site, prevent having to rely on untrained workers at the remote site to interact with critical networking gear, prevent the expense of sending support personnel to the remote site, and be able to scale the system up to hundreds of thousands of devices.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In some aspects, the techniques described herein relate to an Active Power Edge (APE) device including: a power strip including electrical outlets; a MQ Telemetry Transport (MQTT) client to communicate with a broker and to receive a configuration from the broker; and a monitor to enable the electrical outlets per the configuration, to perform status checks and to report a result of the status checks to the broker via the MQTT client, wherein the configuration includes an outlet device and a status check definition, and the status checks are performed per the status check definition.

In some aspects, the techniques described herein relate to an APE device, wherein the MQTT client initiates a connection to the broker upon startup.

In some aspects, the techniques described herein relate to an APE device, wherein the MQTT client keeps the connection to the broker open.

In some aspects, the techniques described herein relate to an APE device, wherein the configuration includes a reboot schedule and the monitor, based on the reboot schedule, forces a reboot of a device powered by one of the electrical outlets by turning off electrical current to the one of the electrical outlets for a duration.

In some aspects, the techniques described herein relate to an APE device, wherein the monitor records a power draw of a device powered by one of the electrical outlets.

In some aspects, the techniques described herein relate to an APE device, wherein the monitor records a power draw of the outlets.

In some aspects, the techniques described herein relate to an APE device, wherein the monitor records a last heartbeat timestamp for the APE device.

In some aspects, the techniques described herein relate to an APE device, wherein the monitor updates the configuration used by the APE device.

In some aspects, the techniques described herein relate to an element power management system including: a broker to interface with Active Power Element (APE) devices, wherein each of the APE devices includes: a power strip including electrical outlets, a MQ Telemetry Transport (MQTT) client to initiate a connection to a broker, to communicate with a broker and to receive a respective configuration from the broker, and a monitor to enable the electrical outlets per the configuration, to perform status checks and to report a result of the status checks to the broker via the MQTT client, wherein the configuration includes an outlet device and a status check definition, and the status checks are performed per the status check definition; and an APE-Element Manager (APE-EM) to register the APE devices, to provide a respective configuration to the broker for each of the APE devices.

In some aspects, the techniques described herein relate to an element power management system, wherein the APE devices initiate a connection to the broker upon startup.

In some aspects, the techniques described herein relate to an element power management system, wherein the APE devices keep the connection to the broker open.

In some aspects, the techniques described herein relate to an element power management system, further including a provisioning system to provide the respective configuration to the APE-EM.

In some aspects, the techniques described herein relate to an element power management system, wherein multiple profiles of multiple customers are managed by the APE-EM.

In some aspects, the techniques described herein relate to an element power management system, wherein the APE-EM includes a Graphics User Interface.

In some aspects, the techniques described herein relate to an element power management system, further including a client to receive status checks from the broker and to store the status checks.

In some aspects, the techniques described herein relate to an element power management system, further including an aggregator to analyze the status checks.

Additional features will be set forth in the description that follows, and in part will be apparent from the description, or may be learned by practice of what is described.

BRIEF DESCRIPTION OF DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
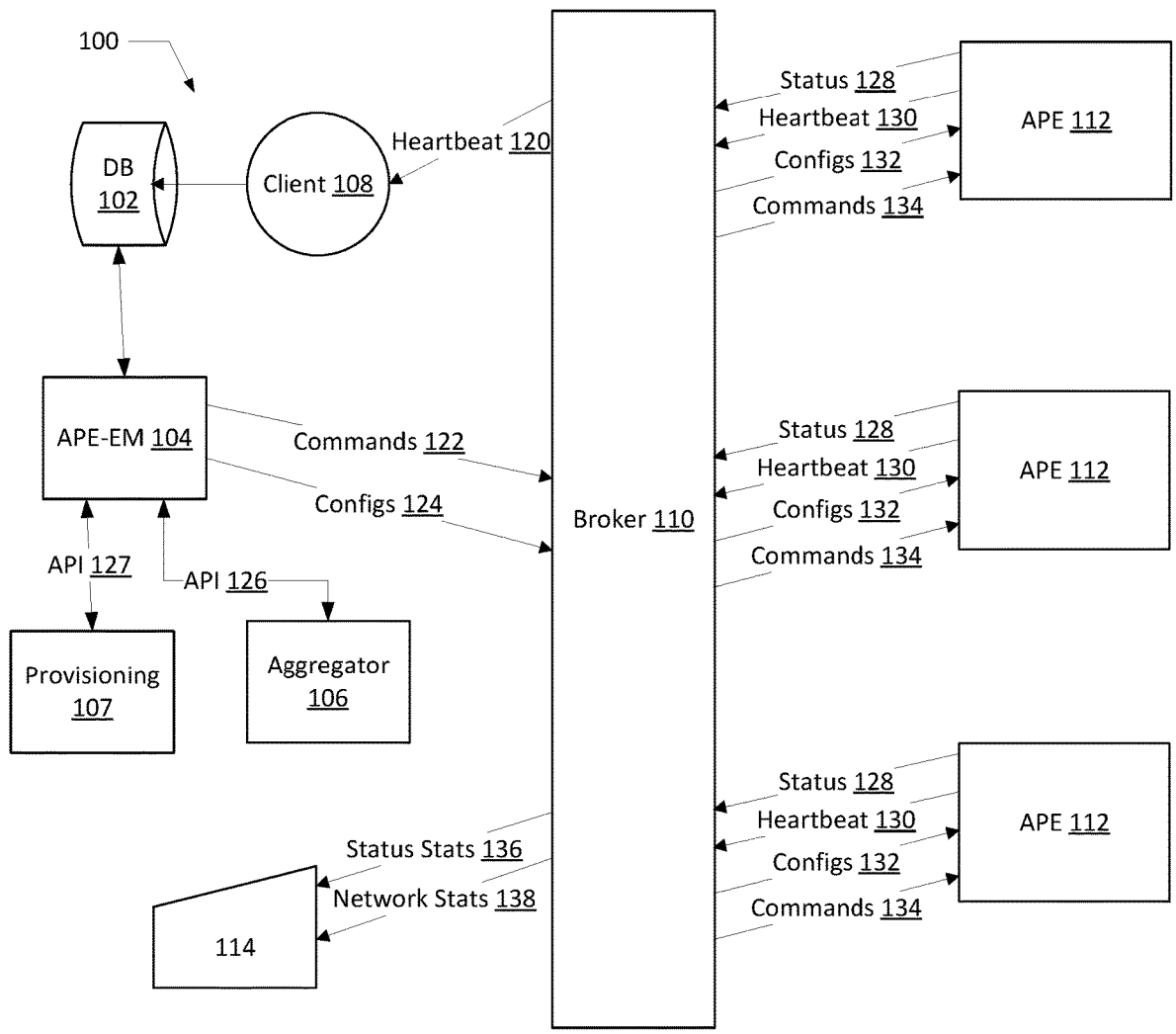
FIG. 1 illustrates an element power management system according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Fully managed network services for businesses includes installation of equipment, management once installed, and live proactive monitoring of the equipment to inform the customer of important events that can impact their business. Extending the reach of those managed service to reduce or prevent network downtime is critical. The present teachings expand the managed service beyond monitoring and alerting to automatically repairing outages, in some cases before the outage can impact the business. The present teachings manage vast networks at a massive scale for hundreds or thousands of sites for hundreds of customers simultaneously.

FIG. 1 illustrates an element power management system according to various embodiments.

An element power management system 100 may include Active Power Edge (APE) devices 112 connected to a broker 110. The broker 110 may be connected to an element manager or APE-EM 104 for the APE devices 112. Status 128 and heartbeat 130 data from the APE device 112 may be reported to the broker 110. Configurations 132 and commands 132 may be forwarded to the APE devices 112 from the broker 110. The broker 110 may relay the configurations 132 and commands 132 from the APE-EM 104 to the APE devices 112. The APE devices 112 may use different configurations. The APE devices 112 may belong to different customers. The APE devices 112 belonging to a customer may use different configurations 132. The APE devices 112 may receive commands by a grouping, by a customer, by a configuration identifier or the like.

The broker 110 may collect Key Performance Indicators (KPIs) and update a database 102 with the KPIs. The broker 110 may report its own heartbeat 120 to the database 102. The reporting of the KPIs or its own heartbeat 120 by the broker 110 to the database 102 may be direct (not shown) or via a database client 108. The status 128 may include KPIs collected during a network connectivity status check or a heartbeat telemetry. The KPIs may include up/down transport speeds, latency, jitter and the like.

The APE-EM 104 may direct the broker 110 to perform periodic or ad-hoc network probes. In some embodiments, the ad-hoc probes may be via commands 122. In some embodiments, the periodic probes may be by directives included in configurations 124. The probes may determine network connectivity status of the APE devices 112 reported as status 128. The probes may determine connectivity status of Network Elements (NEs) drawing power from an outlet of the APE devices 112. When the APE devices 112 first connect to the broker 110, an automated provisioning process may connect to a provisioning/orchestration system 107 via a legacy API 127 to locate device information needed to fully provision each of the APE devices 112. The APE-EM 104 may include an GUI interface (not shown) for human intervention during the provisioning or other management functions of the element power management system 100.

The APE-EM 104 may provide the KPIs in the database 102 to an aggregator 106 with an API 126. The APE-EM 104 may provide the KPIs in the database 102 to the broker 110 or to an external aggregator 114. The aggregator 106 may be deployed at a Network Operations Center (NOC). The network status history for a site or sites may uncover issues with network performance to that site. The aggregator 106 or external aggregator 114 may collect KPIs across thousands to millions of sites as assist in uncovering service irregularities and reveal useful trends for the NOC.

In some embodiments, the element manager may perform transport probing. The transport probing may be a limited, periodic activity. For example, the transport probing may be done daily done during non-business hours to minimize their impact on the transports.

In some embodiments, an APE device and APE-EM are engineered for a single, multi-tenant APE-EM. Separate APE-EM infrastructures for separate customers NOCs may be provisioned. The APE-EM may be hosted in a cloud for ease of scaling. The APE includes an Ethernet LAN connection with access to the internet to be able to communicate with the APE-EM as well as to perform transport probing. All communications between the APE and APE-EM may use secure protocols (such as, HTTPS, SSH). The APE may be configured on-the-fly at install-time.

The APE/APE-EM system can run independent of other NOC systems. In some embodiments, the system may be integrated with a management, monitoring, provisioning, or other business system to support automation and permit0 rapid expansion. This integration may be provided at the APE-EM level via an Application Programming Interface (API).

In some embodiments, integrations with APE status data may be made via a secure broker, for example, a MQ Telemetry Transport (MQTT) broker. MQTT is an OASIS standard messaging protocol for the Internet of Things (IoT). MQTTT is a lightweight publish/subscribe messaging and data exchange transport to connect remote devices with a small code footprint and minimal network bandwidth. MQTT provides a scalable and cost-effective way to connect devices over the Internet. It is able to deliver data over the Internet in near real-time and with guarantees of delivery. MQTT is designed for IoT devices and enables low-cost device communication. When a MQTT broker is used, a MQTT client (not shown) is embedded in each of the APE devices 112.

Network Architecture and Configuration

The APE-EM (EMS), Broker, and API services may be cloud-based, for example, a GCP (Google Cloud Platform). The scaling capacity of the APE-EM supports a rapid growth target of 500,000+ devices in five years with appropriate scaling of the cloud system that supports it.

APE-EM

The APE-EM is the central configuration manager for the APE devices. The APE-EM may provide with a GUI portal interface for personnel access as well as API's for programmatic interactions with other applications such as, orchestration, monitoring, business systems, or the like. In some embodiments, the APE-EM may be multi-tenant such that multiple customer configurations/information resides within the same system for management and integration ease. Per customer, the APE-EM may support a plurality of APE profiles/templates, for instance, "Production", "Pilot/POC", "Test", "Version 1", "Version 2" and the like. The APE-EM is being designed to scale to support 10K's of APE devices.

Active Power Edge (APE) Device

Figure 2:
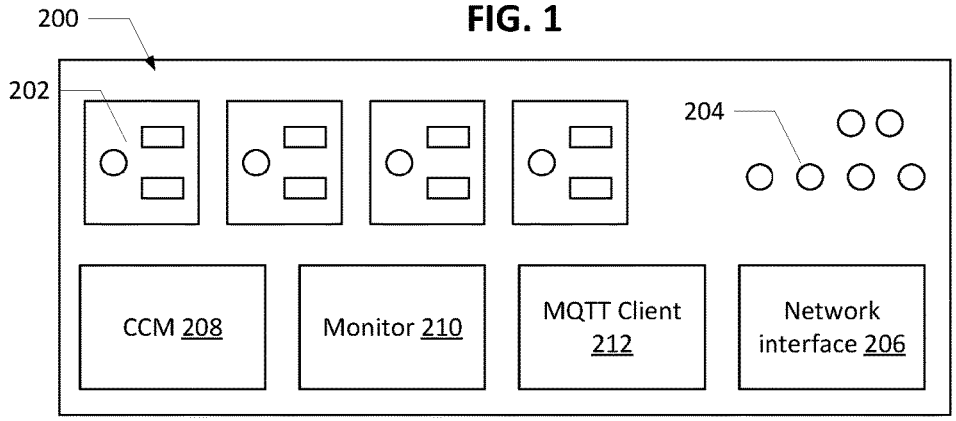
FIG. 2 illustrates an exemplary Active Power Edge (APE) device according to various embodiments.

FIG. 2 illustrates an exemplary Active Power Edge (APE) device according to various embodiments.

FIG. 2 illustrates an APE device 200. The APE device 200 may be an IP enabled power distribution unit (PDU). In some embodiments, the APE device provides electrical outlets 202, for example four electrical outlets. The exemplary APE device may be a 1.5 unit in height device and can be rack mounted. The exemplary APE device uses US Standard 125V outlets/plugs and supports a combined maximum 125 VAC at 12 A maximum across all four outlets that are independently managed. The exemplary APE device has an operating temperature range of 25 C to 50 C, and a non-operating temperature range of −40 C to 70 C. The exemplary APE device has an operating humidity maximum of 95%. The outer dimensions of the exemplary APE device are 8.66"L×4.53"D×2.63"H.

The exemplary APE device is a headless device with lights 204 on the front to convey the device health and status to anyone observing it (for example, an installer). Some of the lights are software-controlled and display a color-coded status of the device. Exemplary light display may be off, solid red, blinking red, solid green, blinking green. A combined light display provides a full picture of the device's current functioning and communication ability with a device or element manager. Status lights are provided for each power outlet, Ethernet link, device power, and two programmable LED lights for devices status or application usage with an API.

Available accessories include a single set of rackmount "ears" (not shown) for standard 19" racks and a bracket for dual APE rackmount option. The exemplary APE device has log down capability for each power outlet total usage by hourly consumption. The exemplary APE device has surge Suppression protection along with an AC-in circuit break protections, plus a light indicator for surge suppression status. Scheduled reboots for each outlet are provided, for example, a daily or weekly reboot for each outlet.

The APE device 200 may include a Custom Computer Module (CCM) 208 including a network port 206. The network port 206 may be an Ethernet port. The CCM 208 may include a monitor 210 and a MQTT client 212. The MQTT client 212 may initiate a connection to a broker. The MQTT client 212 may communicate with a broker. The MQTT client 212 may receive a configuration from the broker. The monitor 210 may enable the electrical outlets per the configuration. The monitor 210 may perform status checks per the status check definition. The monitor 210 may report a result of the status checks to the broker via the MQTT client. The configuration may define properties of each outlet. For example, the configuration may associate an electrical outlet, enablement, a user device expected to be connected to it (such as, modem, router, VSAT or the like), and a status check definition. The status check definition may include a status check command (such as, ping), parameters for the status check command, a status check interval, a reboot schedule or the like.

In some embodiments, the APE device 200 may be configured and controlled with an HTTP web interface or command line via the network port 206 Telnet/SSH. The network port 206 may be used to view a local event log via an HTTP interface, for example. Individual outlets for user use may be restricted.

Figure 3A:
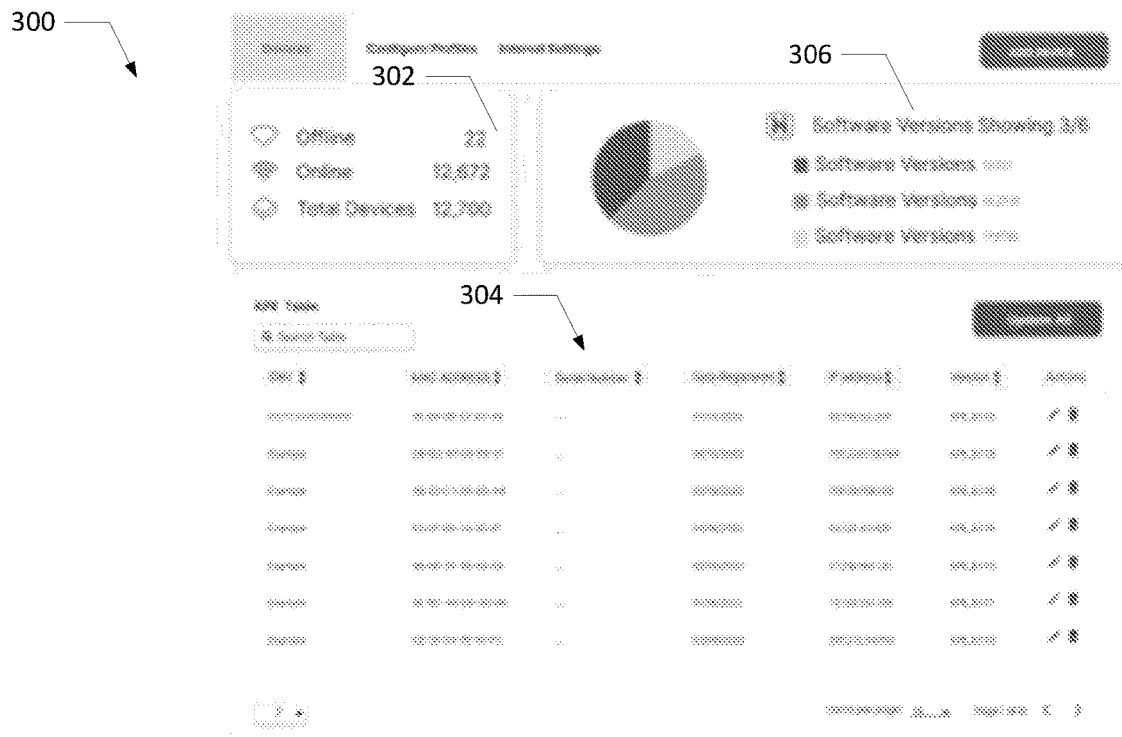
FIG. 3A illustrates a mock screen for a device list according to various embodiments.

FIG. 3A illustrates a mock screen for a device list according to various embodiments.

In FIG. 3A, a mock screen 300 illustrates an online devices summary 302, a version of devices summary 306, and a device listing 304.

Figure 3B:
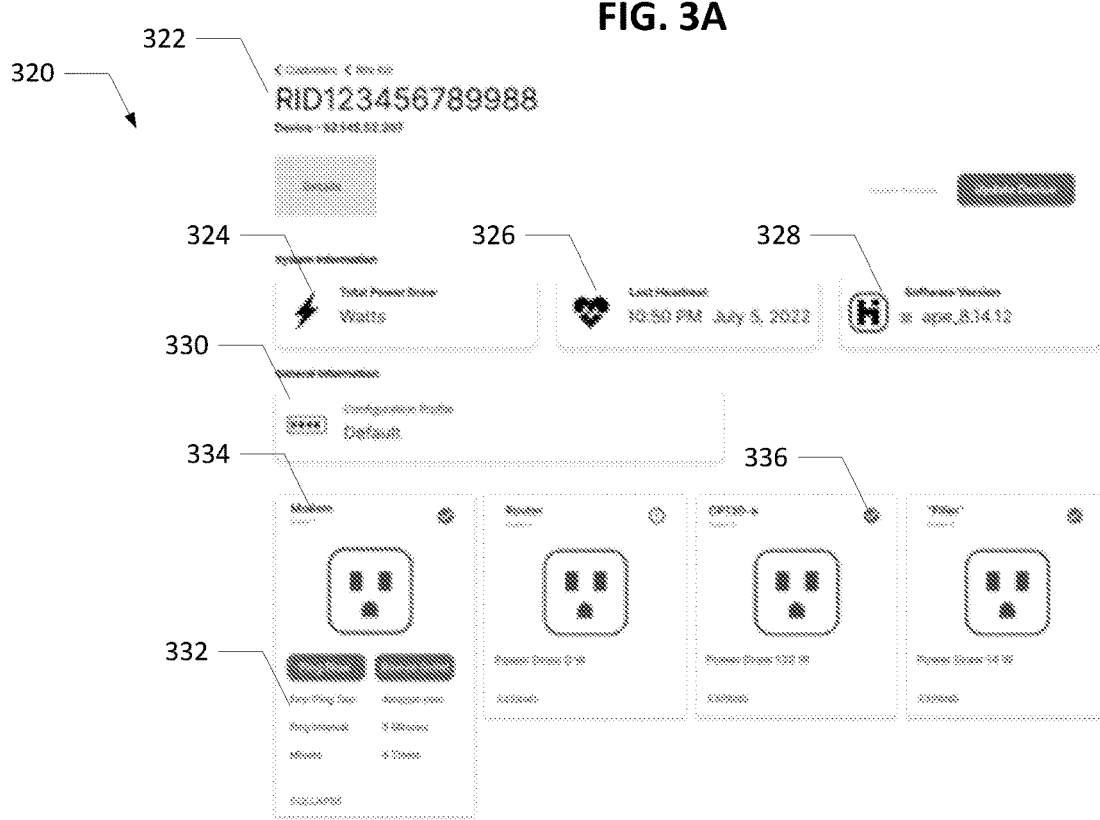
FIG. 3B illustrates a mock screen for a device according to various embodiments.

FIG. 3B illustrates a mock screen for a device according to various embodiments.

In FIG. 3B, a screen 320 illustrates a device id 322, a power draw 324, a last heartbeat 326, a software version 328, a configuration id 330, a connected device status 332. The connected device status 332 may include, for example, a first ping test, a ping interval and ping misses. The screen 320 may illustrate a device type 334 expected to be connected to an outlet via its position on an outer surface of the APE device. The screen 320 may illustrate an outlet light 336 that matches a physical light on an outer surface of the APE device.

Figure 3C:
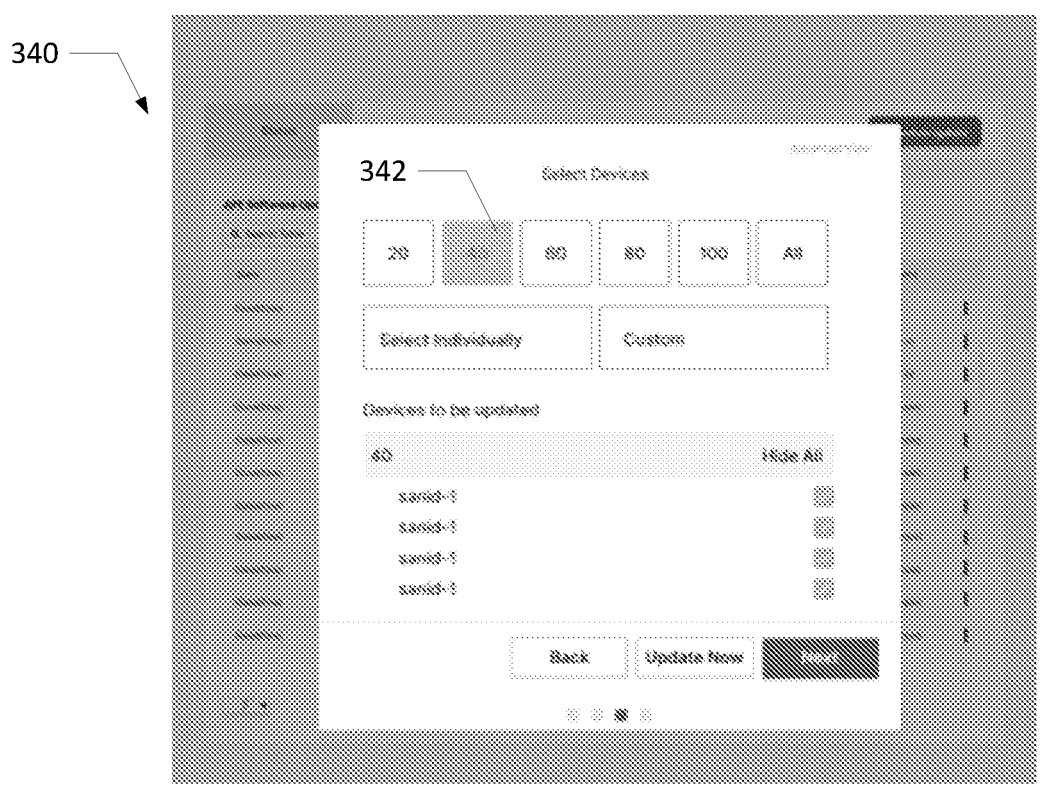
FIG. 3C illustrates a mock screen for a device profile configuration according to various embodiments.

FIG. 3C illustrates a mock screen for a device profile configuration according to various embodiments.

In FIG. 3C, a screen 340 allows for batch 342 configuration updates of ACEs. The configuration updates may be effected immediately or scheduled. The ACEs may be selected as a group or individually.

The exemplary mockup screens for monitoring and provisioning systems may connect via an Application Programming Interface (API) into an APE-EM. In some embodiments, integrations with a NOC user/identity management system, such as, OKTA system (not shown), may govern individual (Network Element (NE), Product, ESC, etc.) access to a Graphics user interface (GUI) portal.

Broker

All communications in/out of the APE devices may be via a broker, for example, an MQTT Broker. The broker may manage and collect telemetry from an APE, for example, heartbeats. The broker may manage and collect information regarding commands send to an APE, for example, outlet bounce, single ping results). The Broker may be a data access point for data needs, such as, subscribing to topics for heartbeat info, syslog info, network scan results, or the like. The APE may be provided network access (internet or intranet) suitable for communication with the Broker and the APE-EM for configuration and reporting.

Remote Architecture and Equipment

The APE resides alongside networking gear installed at each site. The networking gear may be customer-owned devices. In practice and for consistency, the networking gear may be plugged into designated outlets on the APE as defined in a customer-specific install specification. The install specification may match an APE profile.

The APE includes a network connection, such as, an Ethernet connection, to the local site network. Expectation is that the network connection of the APE is on the LAN-side of a WAN-Edge device (in other words, on the "inside" network segment) to best approximate a user data path from the location to a host on the WAN. If there are multiple transports at the location, specific destination routing rules on a WAN-Edge device, such as, a router, a firewall, a SD-WAN device, or the like, may direct the APE pings through the different transports to test connectivity.

In some embodiments, the APE may support a network pass-through mode or multiple network segments. In other embodiments, the APE may act as a single device on a single network segment. As such, the APE lacks awareness of active/standby transport scenarios and has no inherent knowledge of the transports for the test packets.

The APE device initiates connections to the broker. After initiation, the APE device leaves the connection open. The connection must be left open to request commands and configurations from the broker because opening connections takes a long time relative to sending commands and configurations. The opened connection is used to transmit telemetry, such as, heartbeat and status, from the APE device to the broker. In some embodiments, the speed of opening connections is long, for example, over satellite connections. By keeping connections open, when the APE-EM via the broker initiates time-critical requests, the many open connections permit quick communications between the APE devices and the broker.

Monitoring of Remote Equipment

The APE device may be an identified and monitored component of a NOC. The APE device may be an alarmed component on the NOC. In some embodiments, the APE device may be part of the "IoT Service" and may be analogous to other IoT/PDU devices. The APE-EM may be monitored and alarmed at the NOC.

The Customer (end-user) may run a select number of ad hoc commands (such as query device status or power-cycle an outlet) to the APE device via a GUI interface.

Security Requirements for Remote Equipment

In some embodiments, all communication in/out of the APE uses a secure protocol, for example, https, ssh. In some embodiments, certification-based authentication using site's available transports may be used. In some embodiments, the APE device may be augmented to allow http access for initial IP address configuration and provisioning. The http service may be automatically disabled at deployment. Access and commands issued to the APE device may be captured and logged.

Provisioning and Installation

In some embodiments, the APE device comes alive and connects to an APE-EM as Unassigned. An automated provisioning process may connect to a provisioning/orchestration system to locate device information needed to fully provision the APE device. When the APE device is unable to complete provisioning process after connecting to the APE-EM, human interaction using the APE-EM GUI is used to manually complete provisioning process. When the APE device is installed but unable to reach APE-EM via internet, the provisioning system will be unable to assign a profile to the APE device as become aware of its installation. In this scenario, local transport issues need to be investigated/resolved.

By default the APE device relies on DHCP for IP address assignment. The APE device may rely on publicly available time servers for correctly setting the date and time of the device. If the install location does not provide DHCP, an interface built into the device allows for IP address assignment via a locally connected device, such as, a cross-over cable. This configuration interface remains active on the HS54 until the device is able to connect to the APE-EM at which time the interface may be deactivated.

The APE device is an IP-enabled power strip and will require power as well as Internet-access via an network port at the site.

External access to EM and APE Data

The Active Power Edge Element Manager provides for numerous access points for data integration with network services. These access points include REST APIs for data interchange about Customer, Profiles, and APE devices, as well as Broker access for access to live data as it flows to and from the APE devices and EM.

In some embodiments, authentication and authorization into the element manager and REST API may be secured by a token, for example, a Json Web Token (JWT). The token may include the user's information and roles and to access the APIs. The user (or service) must be both authenticated and have the roles for that particular API. For added security the tokens may be shorted-lived requiring frequent refresh.

Access to the broker may be handled by tokens. A system or user with a valid token may view messages Topics in the queue. Additional permissions, beyond the token, may be needed to edit or manipulate the data or Publish to a topic. Tokens may be associated with roles. Subscriptions to available topics may be limited by the roles assigned to a token.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim:

1. An Active Power Edge (APE) device comprising:
a power strip comprising electrical outlets;
a MQ Telemetry Transport (MQTT) client to communicate with a broker and to receive a configuration from the broker; and
a monitor to enable the electrical outlets per the configuration, to perform status checks per the configuration and to report a result of the status checks of the electrical outlets to the broker via the MQTT client,
wherein the configuration comprises an outlet device and a status check definition comprising a status check command, and
the status checks are performed per the status check definition with the status check command.

2. The APE device of claim 1, wherein the MQTT client initiates a connection to the broker upon startup.

3. The APE device of claim 2, wherein the MQTT client keeps the connection to the broker open.

4. The APE device of claim 1, wherein the configuration comprises a reboot schedule and the monitor, based on the reboot schedule, forces a reboot of a device powered by one of the electrical outlets by turning off electrical current to the one of the electrical outlets for a duration.

5. The APE device of claim 1, wherein the monitor records a power draw of a device powered by one of the electrical outlets.

6. The APE device of claim 1, wherein the monitor records a power draw of the outlets.

7. The APE device of claim 1, wherein the monitor records a last heartbeat timestamp for the APE device.

8. The APE device of claim 1, wherein the monitor updates the configuration used by the APE device.

9. An element power management system comprising:
a broker to interface with Active Power Element (APE) devices, wherein each of the APE devices comprises:
a power strip comprising electrical outlets, a MQ Telemetry Transport (MQTT) client to initiate a connection to a broker, to communicate with a broker and to receive a respective configuration from the broker, and a monitor to enable the electrical outlets per the configuration, to perform status checks per the configuration and to report a result of the status checks of the electrical outlets to the broker via the MQTT client, wherein the configuration comprises an outlet device and a status check definition comprising a status check command, and the status checks are performed per the status check definition with the status check command; and an APE-Element Manager (APE-EM) to register the APE devices, to provide a respective configuration to the broker for each of the APE devices.

10. The element power management system of claim 9, wherein the APE devices initiate a connection to the broker upon startup.

11. The element power management system of claim 10, wherein the APE devices keep the connection to the broker open.

12. The element power management system of claim 9, wherein the APE-EM initiates a connection to the broker upon startup.

13. The element power management system of claim 12, wherein the APE-EM keeps the connection to the broker open.

14. The element power management system of claim 9, further comprising a provisioning system to provide the respective configuration to the APE-EM.

15. The element power management system of claim 9, wherein multiple profiles of multiple customers are managed by the APE-EM.

16. The element power management system of claim 9, wherein the APE-EM comprises a Graphics User Interface.

17. The element power management system of claim 9, further comprising a client to receive status checks from the broker and to store the status checks.

18. The element power management system of claim 9, further comprising an aggregator to analyze the status checks.

19. The APE device of claim 1, wherein the status check command comprises a ping command and a network device, and wherein the monitor is further configured to detect that the network device is not reachable by the status check command.

20. The APE device of claim 19, wherein the monitor is further configured to determine an outlet of the electrical outlets associated with the network device and to recycle the power to the outlet.

* * * * *